United States Patent [19]

Scheuer

[11] Patent Number: 5,836,108
[45] Date of Patent: Nov. 17, 1998

[54] FLOATING PLANTER BOX

[76] Inventor: David W. Scheuer, W 1854 Hwy. M., Rib Lake, Wis. 54470

[21] Appl. No.: 845,871

[22] Filed: Apr. 28, 1997

[51] Int. Cl.[6] .............................. A01G 31/02; A01G 7/00
[52] U.S. Cl. .............................. 47/65; 47/39 M; 47/65.5; 47/33; 47/901
[58] Field of Search ........................... 47/65, 65 F, 65 D, 47/65.5, 59, 901, 33, 39 M

[56] References Cited

U.S. PATENT DOCUMENTS

| | | | |
|---|---|---|---|
| 4,098,021 | 7/1978 | Gruber | 47/66 |
| 4,312,152 | 1/1982 | Drury et al. | 47/65 F |
| 4,382,348 | 5/1983 | Kitsu et al. | 47/65 F |
| 4,513,533 | 4/1985 | Gething et al. | 47/65 F |
| 4,536,988 | 8/1985 | Hogen | 47/65 F |
| 5,261,185 | 11/1993 | Koide et al. | 47/65 F |
| 5,291,997 | 3/1994 | He et al. | 206/370 |
| 5,342,512 | 8/1994 | Ngo et al. | 210/151 |

FOREIGN PATENT DOCUMENTS

| | | | |
|---|---|---|---|
| 737418 | 10/1996 | European Pat. Off. | |
| 62272921A | 11/1987 | Japan | 47/65 F |
| 406178626A | 6/1994 | Japan | 47/65 F |
| 1656045A | 6/1991 | U.S.S.R. | 47/65 F |
| 1543961 | 4/1979 | United Kingdom | 47/65 F |
| 2014836 | 9/1979 | United Kingdom | 47/65 F |

OTHER PUBLICATIONS

The New York Times, Meyer Liebowitz, "A Garden on a small Plot of Water", Sep. 1976.

Primary Examiner—Michael J. Carone
Assistant Examiner—Fredrick T. French, III
Attorney, Agent, or Firm—Tipton L. Randall

[57] ABSTRACT

A floating planter box comprises a polyhedral planar base member of a synthetic foam resin less dense than water. A pair of frame members sandwich the base member with one on the top and one on the bottom surface thereof. Side members surround the frames and base member and connect the frame members to hold the base member between the frames. The lower frame member has optional bracing members to strengthen that member. The planter displaces sufficient water to float the unit with the contained volume formed by the top surface and side members filled with soil and plants. An optional anchoring means hold the planter in place on a water surface.

18 Claims, 12 Drawing Sheets

FLOATING PLANTER BOX

FIELD OF THE INVENTION

This invention relates to a planter box and more particularly to a floating planter box for growing ornamental plants.

BACKGROUND OF THE INVENTION

Planter boxes for containing and growing ornamental plants and bushes are well known. These planters are often located on the ground or man-made surfaces, as well as suspended from buildings or other means of support. A planter box which floats on a body of water is a new concept which has significant appeal. Such a planter box protects the plants from damage caused by land dwelling rodents.

European application EP 737,418 discloses a floating island planter, with a water-purifying effect, made of a foamed resin with numerous openings through the bottom to supply water to plants growing in soil within the planter.

Applicant has devised a floating planter box which, by the nature of its construction, allows plants to grow in soil contained within the planter with little attention. Although this planter box has no openings in the bottom, by the design and nature of the materials of construction used, water seeps into the planter and the contained soil to maintain the plants, and seeps out of the soil and planter when there is excess due to rain, thus preventing the plants from excess water damage.

SUMMARY OF THE INVENTION

The invention comprises a floating planter box made up of a generally regular polyhedral planar base member of selected thickness with top and bottom surfaces and an outer edge. The base member is composed of a rigid synthetic foam polymer resin less dense than water and essentially impervious to water. A pair of generally rectangular polyhedral planar frame members of selected thickness conform to the outer edge of and frame the polyhedral base member. The frame members are no larger than the base member, with the first frame member positioned on the top surface of the base member and the second frame member positioned on the bottom surface of the base member.

In one embodiment the frame members are of equal thickness, and a plurality of generally rectangular planar side members are oriented perpendicular to, and completely surround the planar base member. The side members are each positioned in close contact with adjacent side members and securely attached to both of the frame members, thus securing the base member between the frame members. The side members extend a selected distance below the bottom surface of the base member and a selected distance above the top surface of the base member. The side members and base member top surface form a contained volume there upon, adapted to contain soil or growth material with plants therein. The planter box displaces sufficient water to float the box plus soil and plants therein, when placed in a body of water.

In another embodiment the top frame member is about four times as thick as the bottom frame member, and generally rectangular planar side members are oriented perpendicular to, and completely surround the planar base member. The side members are securely attached to both of the frame members, thus securing the base member between the frame members. The side members extend a selected distance below the bottom surface of the base member and a selected distance above the top surface of the base member. The first frame member and base member top surface form a contained volume there upon, adapted to contain soil or growth material with plants therein. The planter box displaces sufficient water to float the box plus soil and plants therein, when placed in a body of water.

DESCRIPTION OF THE PREFERRED EMBODIMENTS

Figure 1:
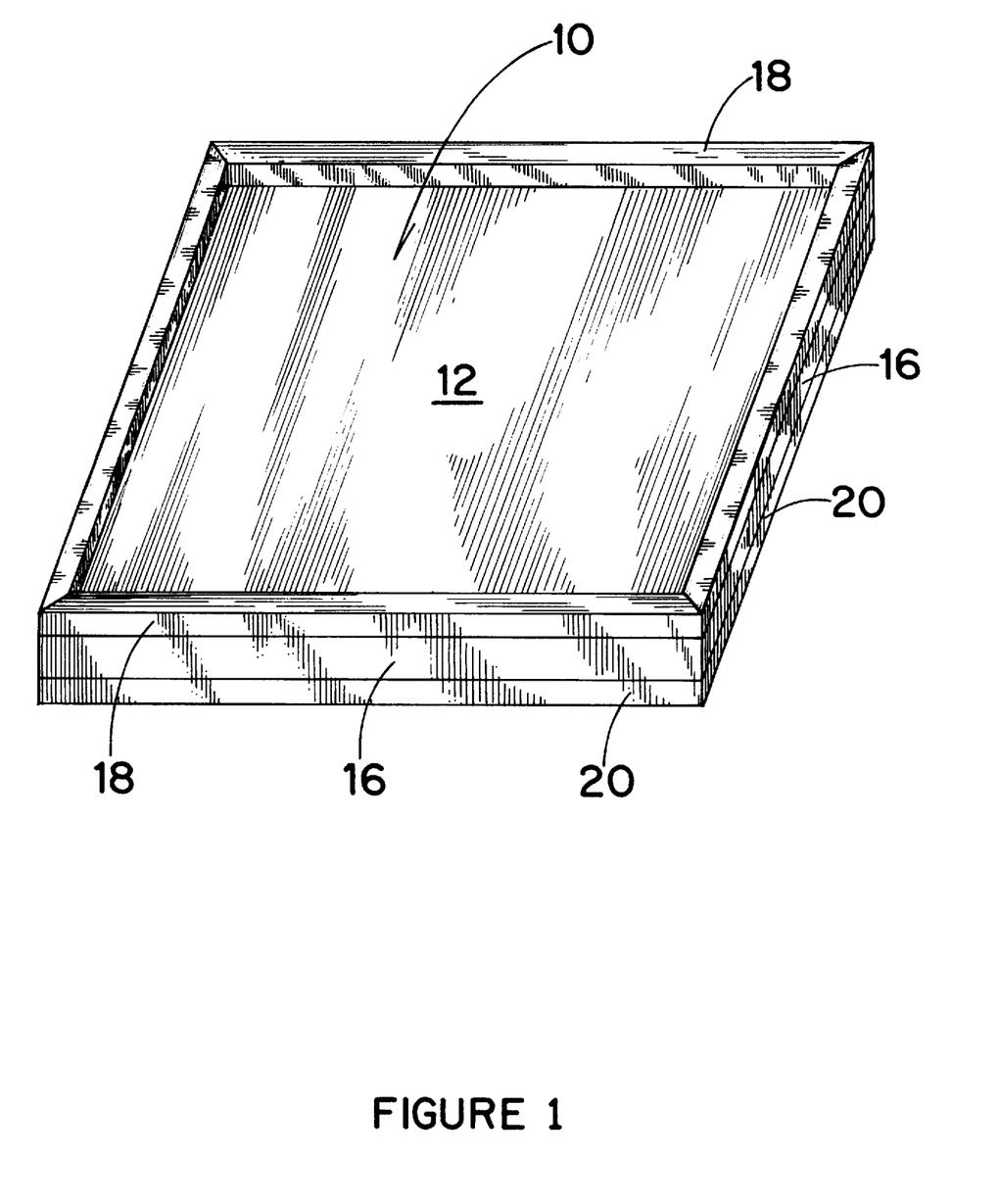
FIG. 1 is a perspective view from above of a base member and the frame members of one embodiment of the invention.

Referring to FIG. 1, the floating planter box comprises a generally rectangular planar base member 10 of selected thickness, with a top surface 12 and a bottom surface 14 and an outer edge 16. The base member is composed of a rigid synthetic foam polymer resin which is less dense than water and essentially impervious to water. The polymer resin is preferably a high density polystyrene product available at most building centers or lumber yards in standard sheet sizes of various thickness. The preferred thickness for the planar base member 10 is about five inches. A single sheet of this thickness may be used, or several sheets of five inch combined thickness when sandwiched together is satisfactory. Applicant has found that the high density polystyrene manufactured by Dow or Corning to be particularly suitable to this application.

Figure 2:
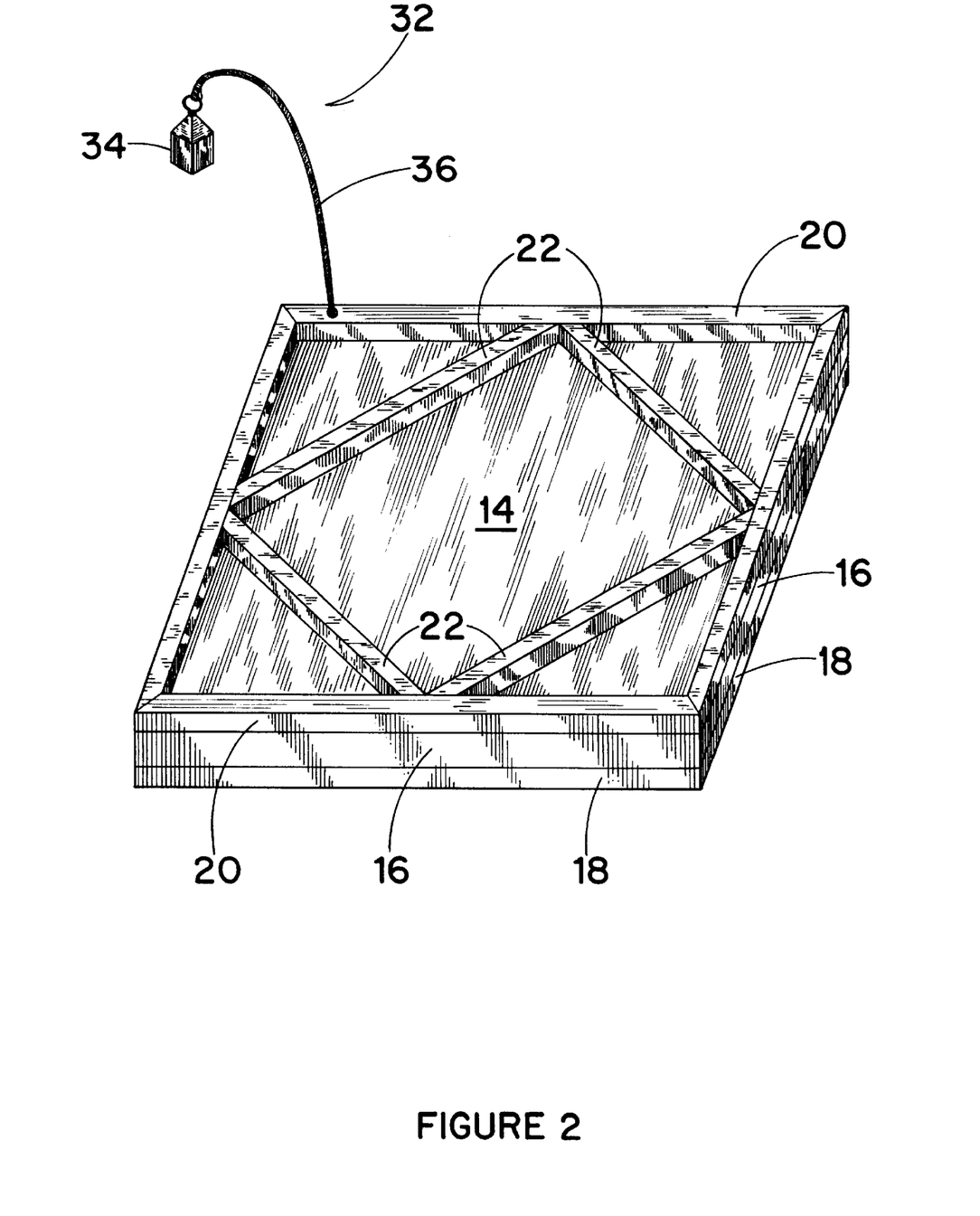
FIG. 2 is a perspective view from below of a base member and the frame members of one embodiment of the invention.

A pair of rectangular frame members conforming to the outer edge 16 of the base member 10 are positioned with a first frame member 18 on the top surface 12 and a second frame member 20 on the bottom surface 14 of the base member 10. The frame members are planar, approximately of equal thickness, with combined thickness about equal to the selected thickness of the base member 10, and preferably constructed of wood, such as cedar, which is resistant to rotting in a damp environment. The frame members (18,20)

have essentially the same outer dimensions as, and are no larger than, the base member 10, thus framing or outlining the base member on the top and bottom surfaces. Optionally, the frame member 20 on the bottom surface may be stiffened by adding four bracing members 22 fastened between adjacent sides of the rectangular frame member 20, thus forming a smaller rectangular frame within the frame member 20, as shown in FIG. 2. The bracing members are similar in cross sectional size to the frame members. The bracing members are also preferably make of wood, such as cedar, which resists rotting in a damp environment. Alternatively, a wood treated chemically to resist rotting may be used for the frame members and bracing members. The frame and bracing members are connected using corrosion resistant screws made of brass or stainless steel. Alternatively, a coated deck screw may be used for fastening purposes. The bracing members 22 stiffen the second frame member 20 which assists in supporting the base member 10.

Figure 3:
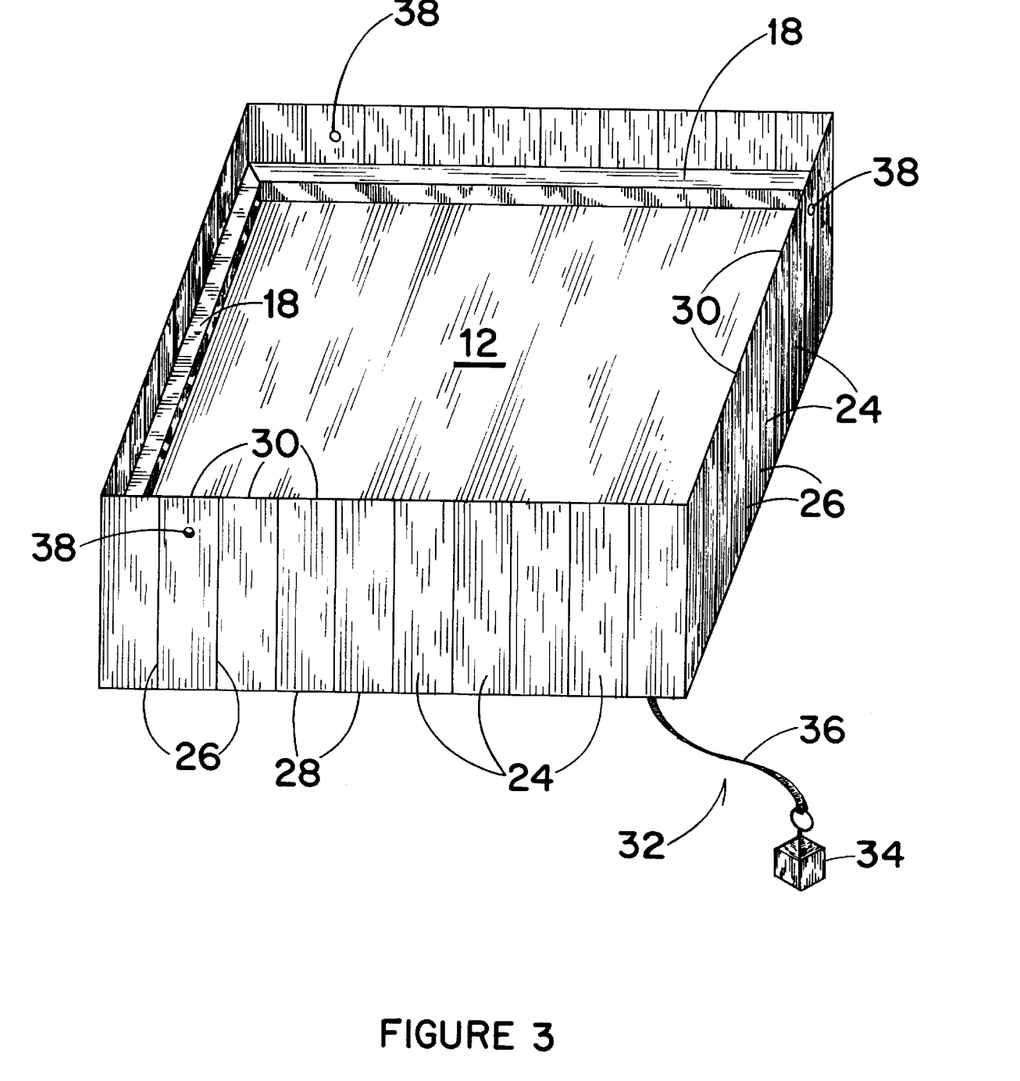
FIG. 3 is a perspective view from above of a complete planter of one embodiment of the invention.

The first 18 and second 20 frame members which surround or sandwich the base member 10 are fastened together by a plurality of generally rectangular planar side members 24 oriented perpendicular to, and completely surrounding the frames and the base member 10. The side members 24 are preferably cedar boards of suitable length and thickness. Again, chemically treated wood may be used for the side members. The side member boards are fastened to both the first and second frame members, preferably with corrosion resistant screws as described for the frame and bracing fasteners. The boards are positioned so that the edges 26 butt tightly against each other, providing a barrier around the base member 10. Thus the frame member with optional bracing and the side members connecting the frame members securely surround the base member without fasteners between these elements and the base member 10. The side members 24 are sized to extend at least to the side of the second frame member 20 opposite the bottom surface 14 of the base member 10, and a selected distance above the first frame member 18 on the top surface 12 of the base member 10. The bottom 28 of the side members 24 are preferably cut square to give an even surface when the planter is resting on land, while the top 30 of the side members 24 may have a variety of ornamental shapes, or simply square as shown in FIG. 3.

The side members 24 and the base member top surface 12 thus form a contained volume which can be filled with soil or other growth material such as peat or compost, and plants, such as ornamental flowers or bushes.

The planter box displaces sufficient water to float the box plus soil and plants when placed in a body of water. For example, a four-foot square box constructed of five inch thick polystyrene with cedar board sides extending about six inches above the top surface of the foam base can hold about 200 to 250 pounds of soil and plants while remaining buoyant. To maintain a floating planter box at a desired location in a body of water, an anchoring means 32, such as a weight or a stone 34 connected to a rope or wire 36 of suitable length, is secured to the bottom frame member 20.

As mentioned above, the side member boards 24 are positioned so that the edges 26 butt tightly against each other, providing a barrier around the frame members and base member 10. The butted side members boards are not completely water tight however. The use of cedar boards or chemically treated wood boards as the side members 24 allows water from outside the contained space in the planter to permeate to the soil contained therein, thus watering the plants growing in the soil. Conversely, excessive rain falling into the planter will permeate through or between the cedar board side members and exit the planter, preventing the plants from drowning.

Optionally, one or more of said side members 24 may contain a small aperture 38 located in the portion of the side member extending above the first frame member 18. The aperture allows for the outflow of excessive rainfall from the contained volume of the planter box.

Figure 4:
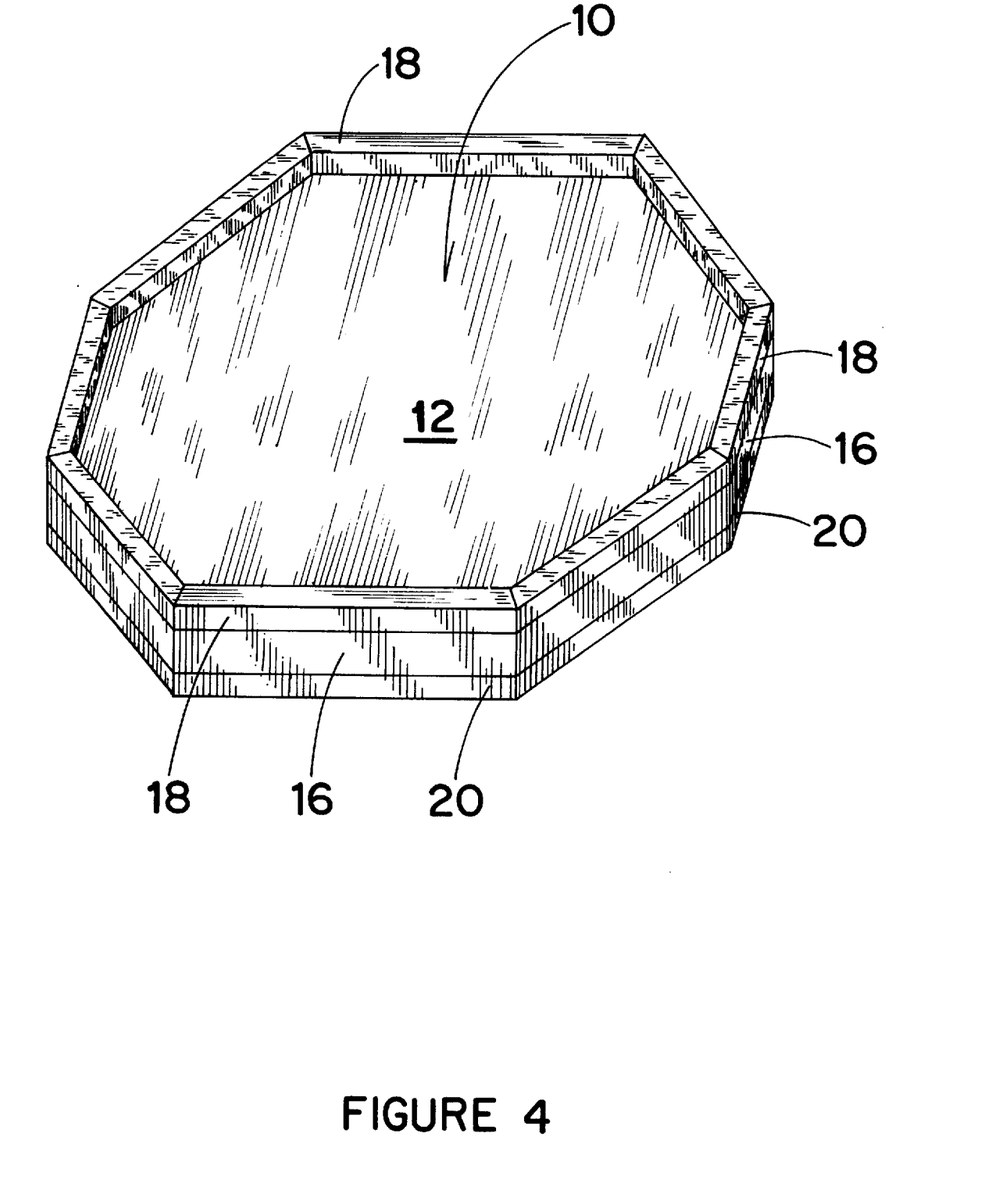
FIG. 4 is a perspective view from above of a base member and the frame members of another embodiment of the invention.
Figure 5:
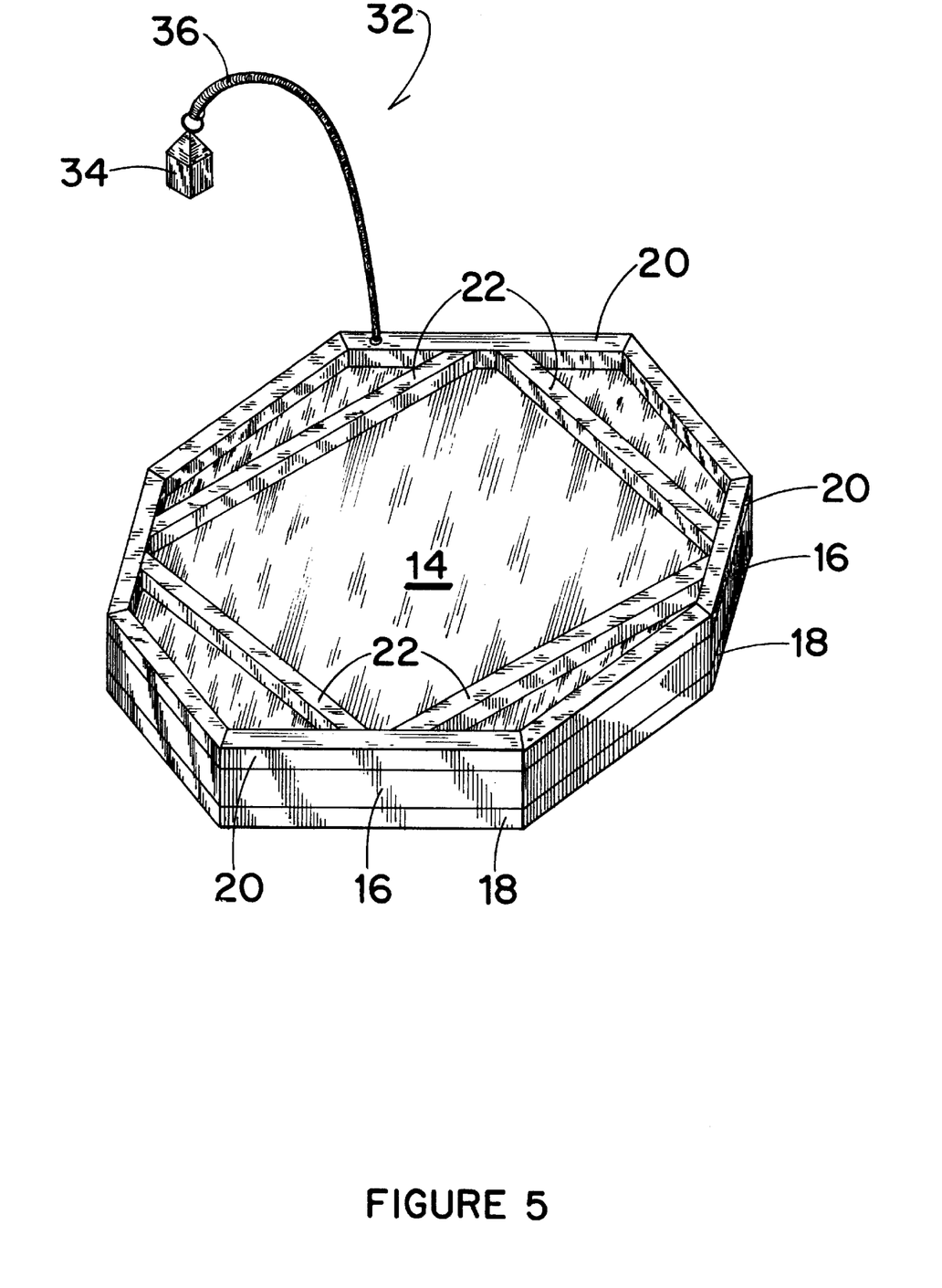
FIG. 5 is a perspective view from below of a base member and the frame members of another embodiment of the invention.
Figure 6:
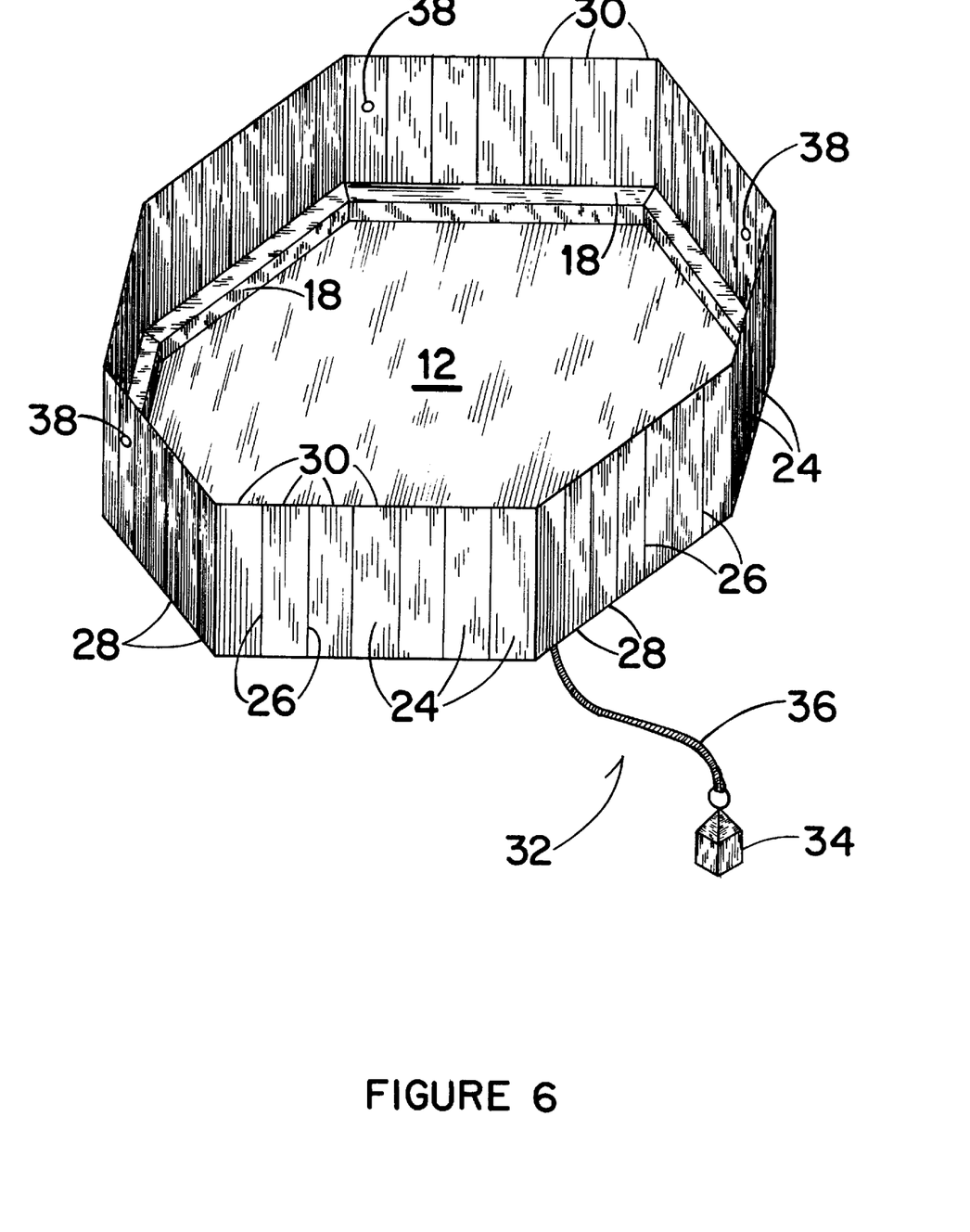
FIG. 6 is a perspective view from above of a complete planter of another embodiment of the invention.

Referring to FIGS. 4–6, another embodiment of the invention is shown. Those elements common with FIGS. 1–3 are denoted with the same indica. In FIGS. 4–6 the floating planter box comprises a general octahedral planar base member 10 of selected thickness, with a top surface 12 and a bottom surface 14 and an outer edge 16. The base member is composed of a rigid synthetic foam polymer resin which is less dense than water and essentially impervious to water. The polymer resin is preferably a high density polystyrene product available at most building centers or lumber yards in standard sheet sizes of various thickness. The preferred thickness for the planar base member 10 is about five inches. A single sheet of this thickness may be used, or several sheets of five inch combined thickness when sandwiched together is satisfactory. Applicant has found that the high density polystyrene manufactured by Dow or Corning to be particularly suitable to this application.

A pair of octahedral frame members conforming to the outer edge 16 of the base member 10 are positioned with a first frame member 18 on the top surface 12 and a second frame member 20 on the bottom surface 14 of the base member 10. The frame members are planar, approximately of equal thickness, with combined thickness about equal to the selected thickness of the base member 10, and preferably constructed of wood, such as cedar, which is resistant to rotting in a damp environment. The frame members (18,20) have essentially the same outer dimensions as, and are no larger than, the base member 10, thus framing or outlining the base member on the top and bottom surfaces. Optionally, the frame member 20 on the bottom surface may be stiffened by adding four bracing members 22 fastened between alternating sides of the octahedral frame member 20, thus forming a smaller rectangular frame within the frame member 20, as shown in FIG. 5. The bracing members are similar in cross sectional size to the frame members. The bracing members are also preferably make of wood, such as cedar, which resists rotting in a damp environment. Again, chemically treated wood may be used for the frame and bracing members. The frame and bracing members are connected using corrosion resistant screws made of brass or stainless steel. Alternatively, a coated deck screw may be used for fastening purposes. The bracing members 22 stiffen the second frame member 20 which assists in supporting the base member 10. The first 18 and second 20 frame members which surround or sandwich the base member 10 are fastened together by a plurality of generally rectangular planar side members 24 oriented perpendicular to, and completely surrounding the frames and the base member 10. The side members 24 are preferably cedar boards of suitable length and thickness. Again, chemically treated wood may be used for the side members. The side member boards are fastened to both the first and second frame members, preferably with corrosion resistant screws as described for the frame and bracing fasteners. The boards are positioned so that the edges 26 butt tightly against each other, providing a barrier around the frame members and base member 10. Thus the frame member with optional bracing and the side members connecting the frame members securely surround the base member without fasteners between these elements and the base member 10. The side members 24 are sized to extend at least to the side of the second frame member 20 opposite the bottom surface 14 of the base member 10, and a selected distance above the first frame member 18 on the top surface 12 of the base member 10. The bottom 28 of the side members 24 are preferably cut square to give an even surface when the planter is resting on land, while the top 30 of the side members 24 may have a variety of ornamental shapes, including square as shown in FIG. 6.

The side members 24 and the base member top surface 12 thus form a contained volume which can be filled with soil or other growth material such as peat or compost, and plants, such as ornamental flowers or bushes. The weight of soil and plants supported by the octahedral shaped embodiment are comparable with that described for the rectangular embodiment of the invention. Again, the butted side member boards are not completely water tight, thus allowing water to permeate through or between the side members.

Several alternative embodiments of the invention are shown in FIGS. 7–12 where the top frame member is of about the same thickness as the base member and the perpendicular side members are thin sheets made of a synthetic polymer.

Figure 7:
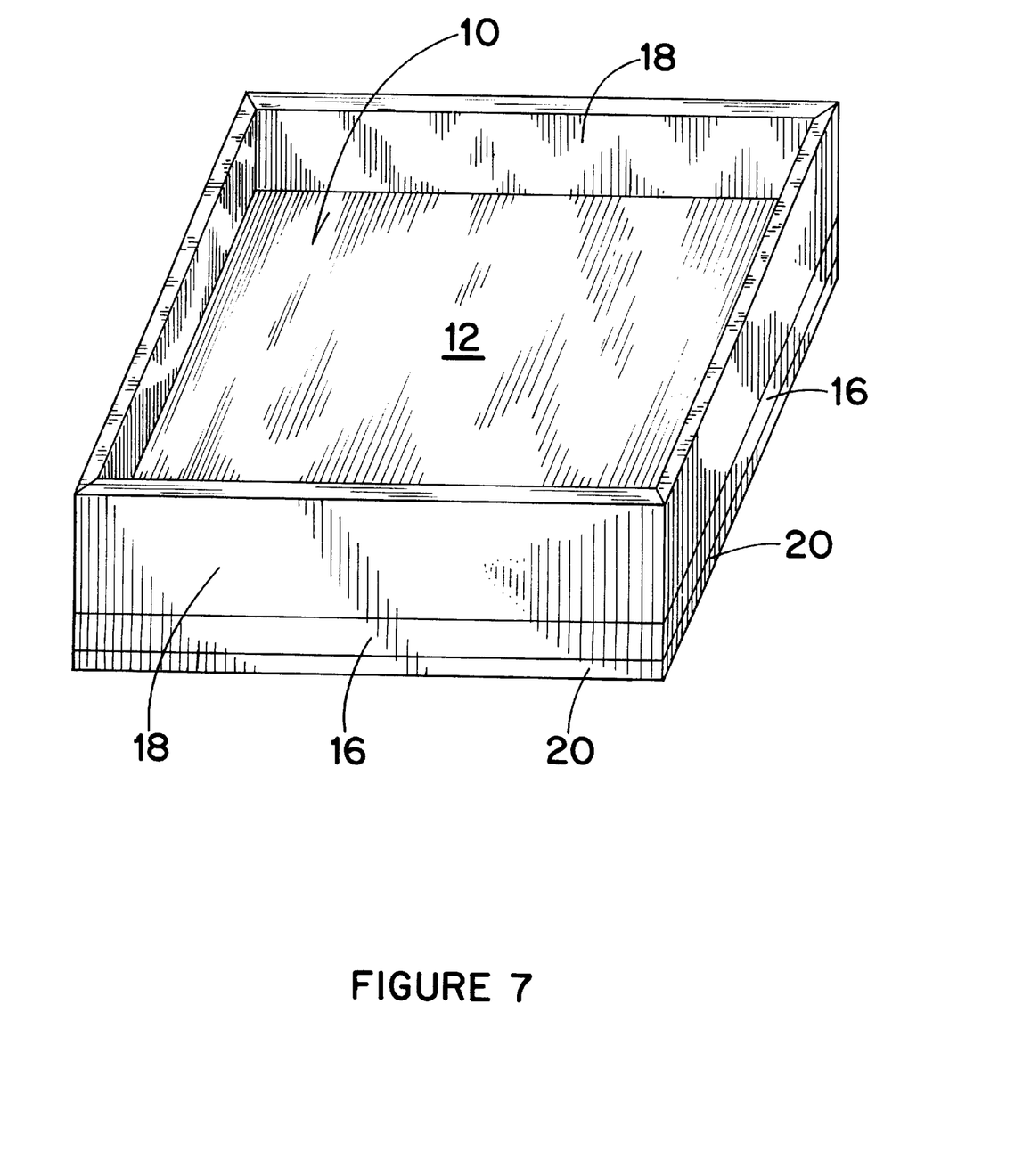
FIG. 7 is a perspective view from above of a base member and the frame members of another embodiment of the invention.

Referring to FIG. 7, the floating planter box comprises a generally rectangular planar base member 10 of selected thickness, with a top surface 12 and a bottom surface 14 and an outer edge 16. The base member is composed of a rigid synthetic foam polymer resin which is less dense than water and essentially impervious to water. The polymer resin is preferably a high density polystyrene product available at most building centers or lumber yards in standard sheet sizes of various thickness. The preferred thickness for the planar base member 10 is about five inches. A single sheet of this thickness may be used, or several sheets of five inch combined thickness when sandwiched together is satisfactory. Applicant has found that the high density polystyrene manufactured by Dow or Corning to be particularly suitable to this application.

Figure 8:
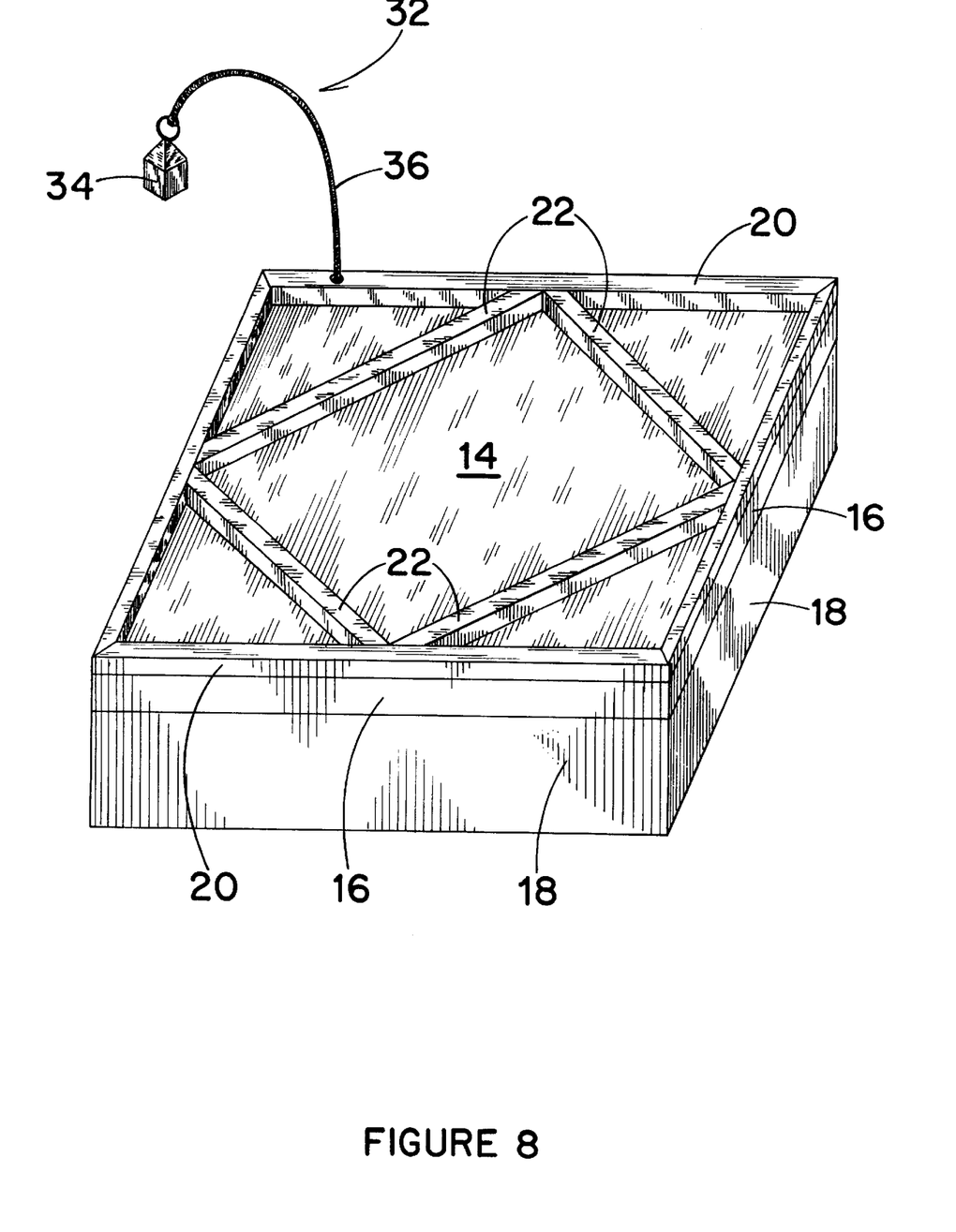
FIG. 8 is a perspective view from below of a base member and the frame members of another embodiment of the invention.

A pair of rectangular frame members conforming to the outer edge 16 of the base member 10 are positioned with a first frame member 18 on the top surface 12 and a second frame member 20 on the bottom surface 14 of the base member 10. The frame members are planar, with the first frame member 18 of thickness about equal to the selected thickness of the base member 10, and about four times the thickness of the second frame member 20. The first frame member 20 is preferably constructed of one inch by six inch boards with the narrow edge contacting the base member top surface 12. Both frame members are preferably constructed of wood, such as cedar, which is resistant to rotting in a damp environment. The frame members (18,20) have essentially the same outer dimensions as, and are no larger than, the base member 10, thus framing or outlining the base member on the top and bottom surfaces. Optionally, the frame member 20 on the bottom surface may be stiffened by adding four bracing members 22 fastened between adjacent sides of the rectangular frame member 20, thus forming a smaller rectangular frame within the frame member 20, as shown in FIG. 8. The bracing members are similar in cross sectional size to the second frame member 20. The bracing members are also preferably make of wood, such as cedar, which resists rotting in a damp environment. Again, chemically treated wood may also be used for the frame and bracing members. The frame and bracing members are connected using corrosion resistant screws made of brass or stainless steel. Alternatively, a coated deck screw may be used for fastening purposes. The bracing members 22 stiffen the second frame member 20 which assists in supporting the base member 10.

Figure 9:
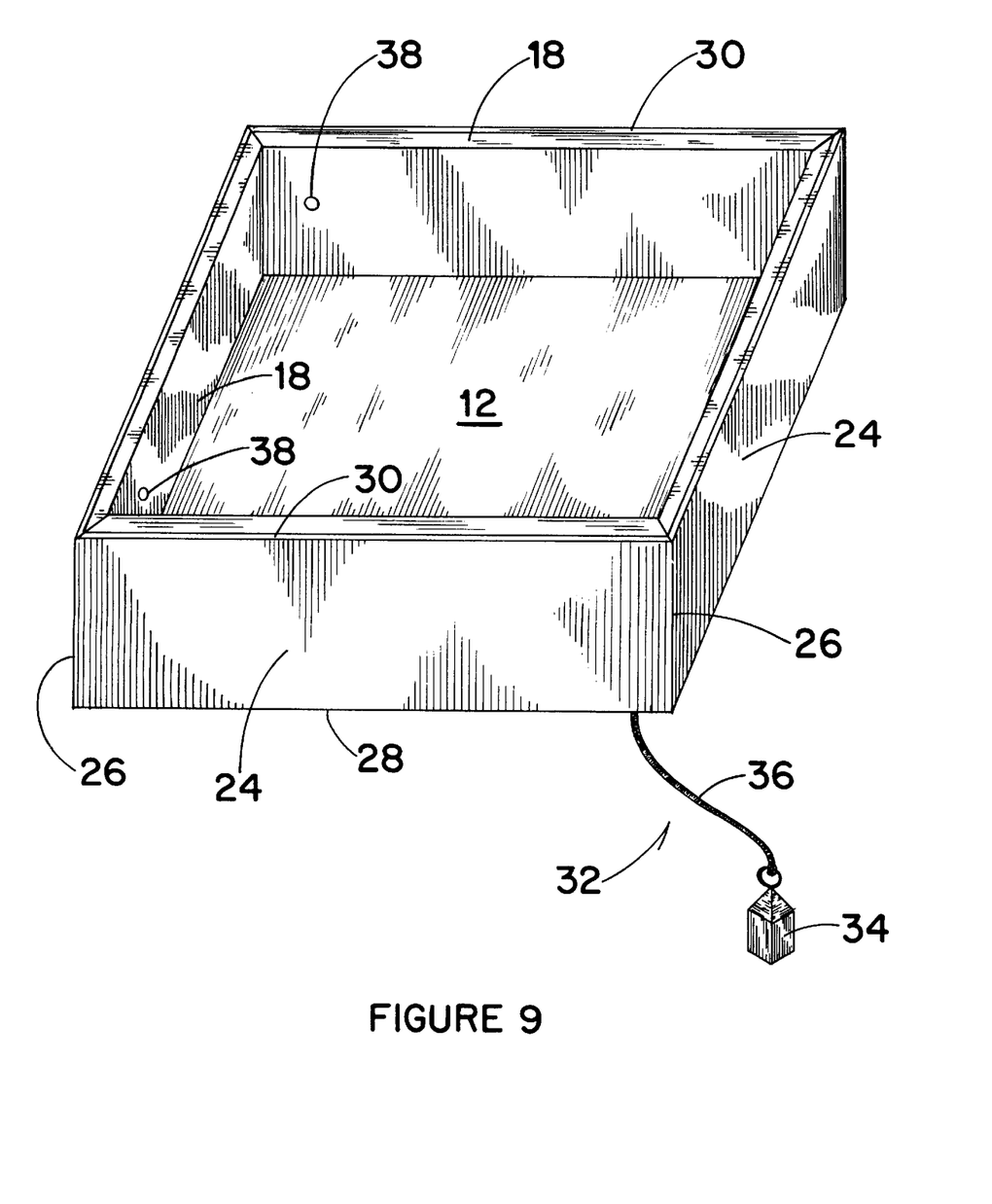
FIG. 9 is a perspective view from above of a complete planter of another embodiment of the invention.

The first 18 and second 20 frame members which surround or sandwich the base member 10 are fastened together by a plurality of generally rectangular planar side members 24 oriented perpendicular to, and completely surrounding the frames and the base member 10. The side members 24 are preferably sheet-like pieces of a synthetic polymer material, such as polyvinyl chloride or polypropylene, of suitable length and thickness. These materials are also are readily available commercially. The side members are fastened to both the first and second frame members, preferably with corrosion resistant screws as described for the frame and bracing fasteners. The side members are positioned so that the edges 26 butt against each other, providing a barrier around the frame members and base member 10. Thus the frame member with optional bracing and the side members connecting the frame members securely surround the base member without fasteners between these elements and the base member 10. The side members 24 are sized to extend at least to the side of the second frame member 20 opposite the bottom surface 14 of the base member 10, and to the side of the first frame member 18 opposite the top surface 12 of the base member 10. The bottom 28 and the top 30 of the side members 24 are preferably just even with the outside edges of the frame members as shown in FIG. 9.

The first frame member 18 and the base member top surface 12 thus form a contained volume which can be filled with soil or other growth material such as peat or compost, and plants, such as ornamental flowers or bushes. The use of cedar boards as the first frame member 18 allows water from outside the contained space in the planter to permeate to the soil contained therein, thus watering the plants growing in the soil. The water simply seeps in through the joints in the first frame member 18 into the soil. The planar side members 24 fastened to the first frame member 18 do not prevent water from seeping into the contained soil. Conversely, excessive rain falling into the planter will permeate through the joints in the cedar boards and exit the planter, preventing the plants from drowning.

Optionally, said first frame member 18 and attached side member 24 may contain one or more small aperture 38 located in the portion of the frame member and side member extending above the normal water line outside the planter. The aperture allows for the outflow of excessive rainfall from the contained volume of the planter box.

The planter box displaces sufficient water to float the box plus soil and plants when placed in a body of water. An optional anchoring means 32 as described above is fastened the second frame member 20 for holding the planter box in place on a body of water.

Referring to FIGS. 9–12, another embodiment of the invention is shown. Those elements common with FIGS. 4–6 are denoted with the same indica. In FIGS. 9–12 the floating planter box comprises a general octahedral planar base member 10 of selected thickness, with a top surface 12 and a bottom surface 14 and an outer edge 16. The base member is composed of a rigid synthetic foam polymer resin which is less dense than water and essentially impervious to water. The polymer resin is preferably a high density polystyrene product available at most building centers or lumber yards in standard sheet sizes of various thickness. The preferred thickness for the planar base member 10 is about five inches. A single sheet of this thickness may be used, or several sheets of five inch combined thickness when sandwiched together is satisfactory. Applicant has found that the high density polystyrene manufactured by Dow or Corning to be particularly suitable to this application.

Figure 10:
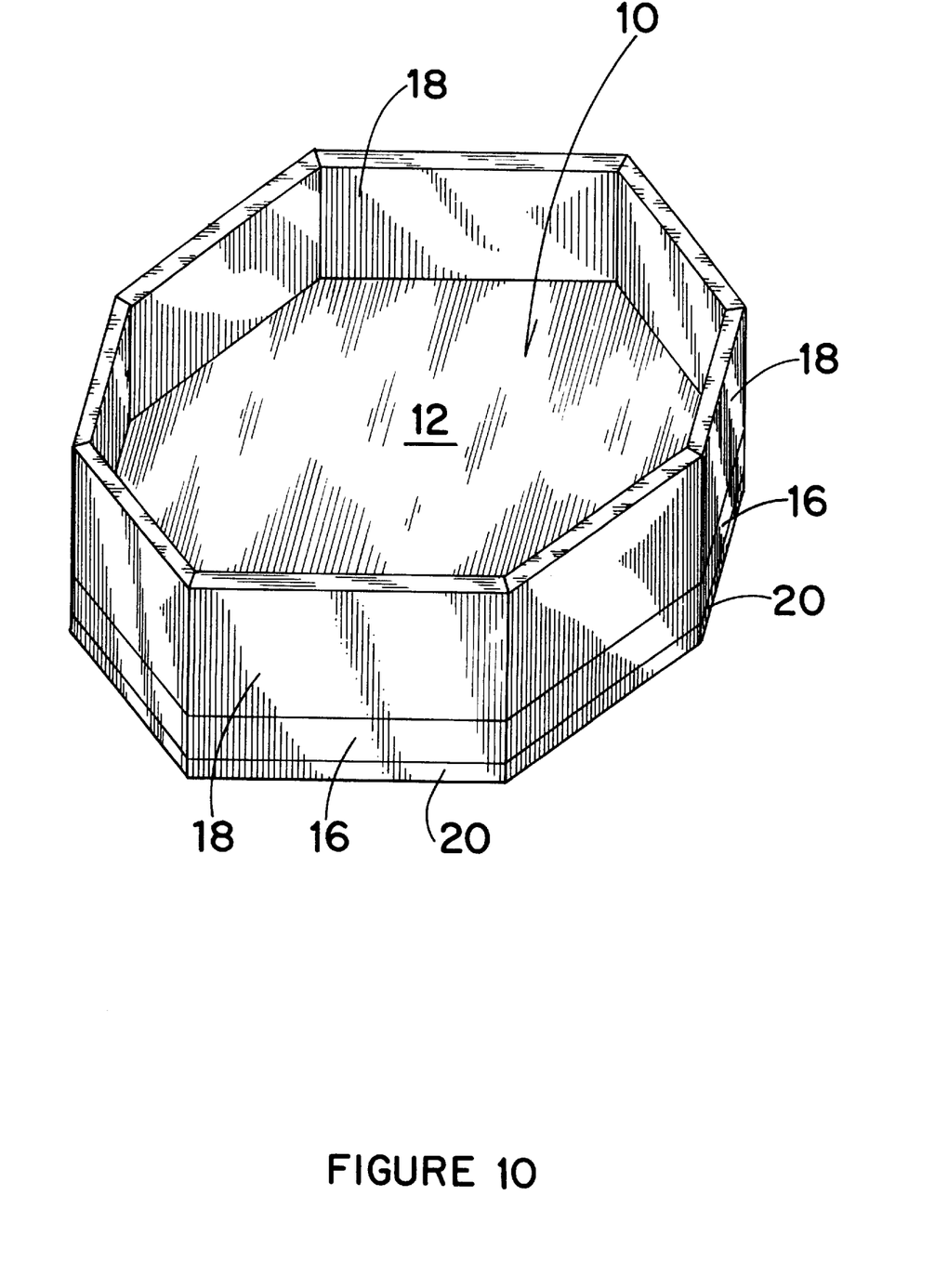
FIG. 10 is a perspective view from above of a base member and the frame members of another embodiment of the invention.
Figure 11:
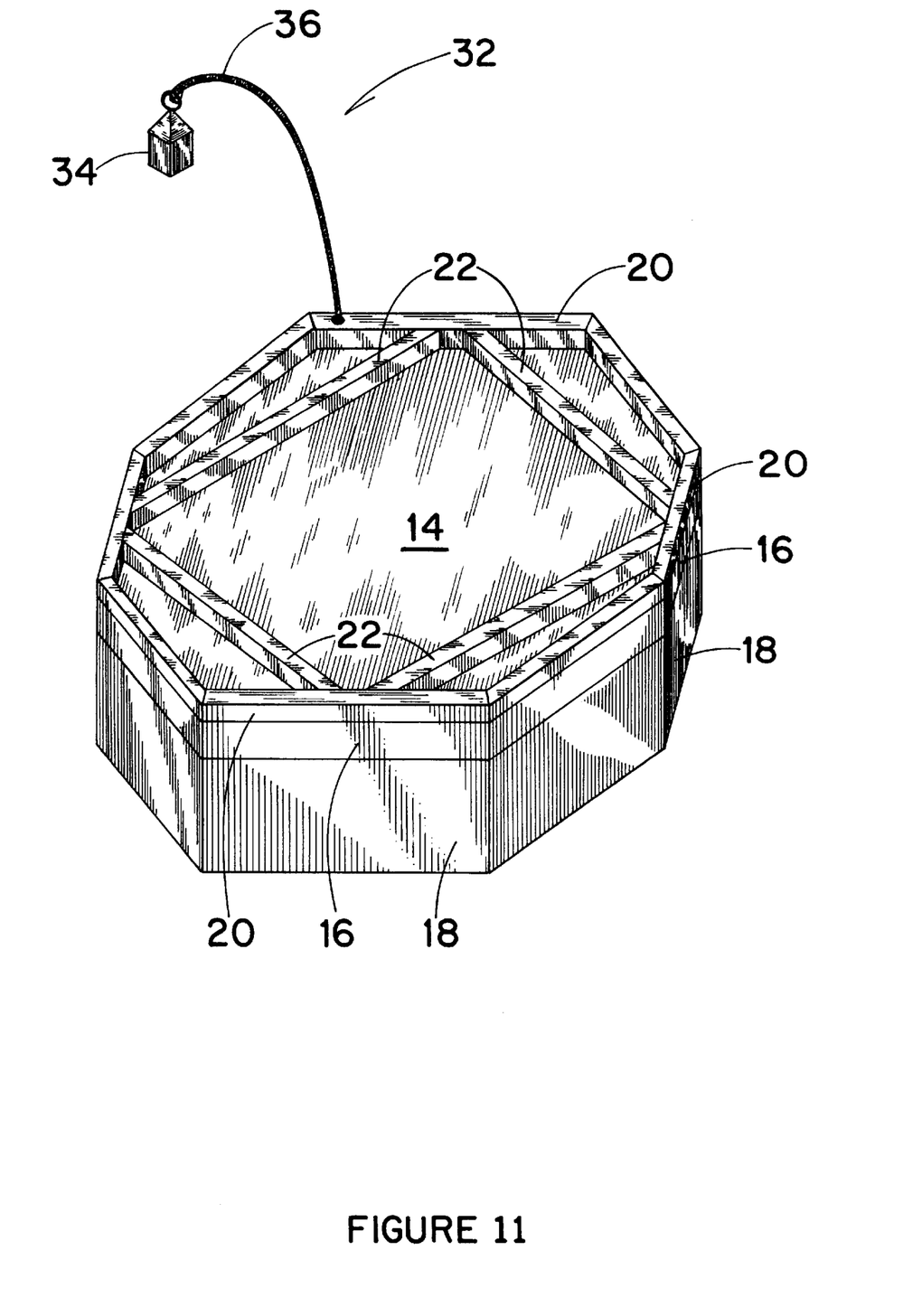
FIG. 11 is a perspective view from below of a base member and the frame members of another embodiment of the invention.

A pair of octahedral frame members conforming to the outer edge 16 of the base member 10 are positioned with a first frame member 18 on the top surface 12 and a second frame member 20 on the bottom surface 14 of the base member 10. The frame members are planar, with the first frame member 18 of thickness about equal to the selected thickness of the base member 10, and about four times the thickness of the second frame member 20. The first frame member 20 is preferably constructed of one inch by six inch boards with the narrow edge contacting the base member top surface 12. Both frame members are preferably constructed of wood, such as cedar, which is resistant to rotting in a damp environment. The frame members (18,20) have essentially the same outer dimensions as, and are no larger than, the base member 10, thus framing or outlining the base member on the top and bottom surfaces. Optionally, the frame member 20 on the bottom surface may be stiffened by adding four bracing members 22 fastened between alternate sides of the octahedral frame member 20, thus forming a smaller rectangular frame within the frame member 20, as shown in FIG. 11. The bracing members are similar in cross sectional size to the second frame member 20. The bracing members are also preferably make of wood, such as cedar, which resists rotting in a damp environment. Substituting a chemically treated wood for cedar is also satisfactory. The frame and bracing members are connected using corrosion resistant screws made of brass or stainless steel. Alternatively, a coated deck screw may be used for fasteneing purposes. The bracing members 22 stiffen the second frame member 20 which assists in supporting the base member 10.

Figure 12:
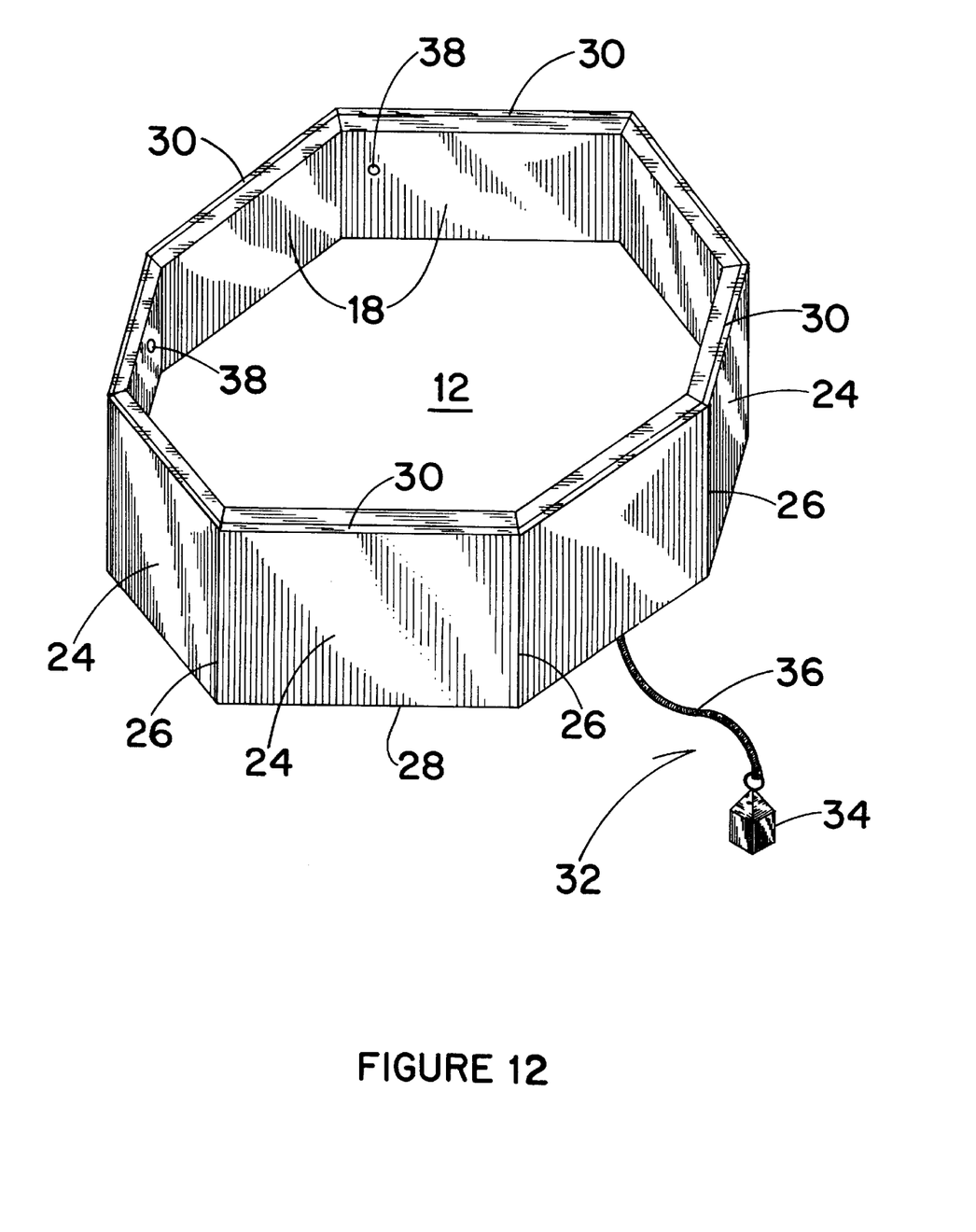
FIG. 12 is a perspective view from above of a complete planter of another embodiment of the invention.

The first 18 and second 20 frame members which surround or sandwich the base member 10 are fastened together by a plurality of generally rectangular planar side members 24 oriented perpendicular to, and completely surrounding the frames and the base member 10. The side members 24 are preferably sheet-like pieces of a synthetic polymer material, such as polyvinyl chloride or polypropylene, of suitable length and thickness. These materials are also are readily available commercially. The side members are fastened to both the first and second frame members, preferably with corrosion resistant screws as described for the frame and bracing fasteners. The side members are positioned so that the edges 26 overlap each other, providing a barrier around the frame members and base member 10. Thus the frame member with optional bracing and the side members connecting the frame members securely surround the base member without fasteners between these elements and the base member 10. The side members 24 are sized to extend at least to the side of the second frame member 20 opposite the bottom surface 14 of the base member 10, and to the side of the first frame member 18 opposite the top surface 12 of the base member 10. The bottom 28 and the top 30 of the side members 24 are preferably just even with the outside edges of the frame members as shown in FIG. 12.

The first frame member 18 and the base member top surface 12 thus form a contained volume which can be filled with soil or other growth material such as peat or compost, and plants, such as ornamental flowers or bushes. The use of cedar boards as the first frame member 18 allows water from outside the contained space in the planter to permeate to the soil contained therein, thus watering the plants growing in the soil. The water simply seeps in through the joints in the first frame member 18 into the soil contained therein. Conversely, excessive rain falling into the planter will permeate through the joints in the cedar boards and exit the planter, preventing the plants from drowning. Optionally, said frame member 18 and attached side member 24 may contain one or more small aperture 38 located in the portion of the frame member and side member extending above the normal water line of the floating planter box. The aperture allows for the outflow of excessive rainfall from the contained volume of the planter box.

While the invention has been particularly shown and described with reference to a preferred embodiment thereof, it will be understood by those skilled in the art that various changes in form and detail may be made therein without departing from the spirit and scope of the invention.

I claim:

1. A floating planter box comprising:
   a) a generally regular polyhedral planar base member of selected thickness with top and bottom surfaces and an outer edge, said base member composed of a rigid synthetic foam polymer resin less dense than water and essentially impervious to water;
   b) a pair of generally regular polyhedral planar frame members of selected thickness conforming to the outer edge of and framing said generally regular polyhedral base member, said frame members being no larger than said base member, a first frame member positioned on the top surface of said base member and a second frame member positioned on the bottom surface of said base member, said pair of planar frame members of equal thickness and of combined thickness about equal to said selected thickness of said base member;
   c) a plurality of generally rectangular planar side members oriented perpendicular to, and completely surrounding said planar base member, said side members each positioned in close contact with adjacent said members and securely attached to both of said pair of frame members securing said base member between said pair of frame members, said side members extending a selected distance below said bottom surface of said base member and a selected distance above said top surface of said base member, said side members and base member top surface forming a contained volume there upon, adapted to contain soil or growth material with plants therein, said planter box displacing sufficient water to float said box plus soil and plants therein, when placed in a body of water.

2. A planter box according to claim 1 wherein said regular polyhedral planar base member and said regular polyhedral planar frame members are generally of a rectangular shape.

3. A planter box according to claim 2 further comprising four bracing members, each member fastened between adjacent sides of said rectangular second frame member positioned on the bottom surface of said base member, said bracing members thereby stiffening said second frame member and supporting said base member thereon.

4. A planter box according to claim 1 wherein said regular polyhedral planar base member and said regular polyhedral planar frame members are generally of an octahedral shape.

5. A planter box according to claim 4 further comprising four bracing members, each member fastened between alternating sides of said octahedral second frame member positioned on the bottom surface of said base member, said bracing members thereby stiffening said second frame member and supporting said base member thereon.

6. A planter box according to claim 1 wherein said base member is composed of polystyrene foam resin.

7. A planter box according to claim 1 further comprising anchoring means attached to said second frame member positioned on the bottom surface of said base member to anchor said floating planter box at a selected location on a body of water.

8. A planter box according to claim 1 wherein said frame members and planar side member are made of rot resistant wood.

9. A planter box according to claim 1 wherein said plurality of planar side members contain at least one aperture to allow water to flow out of said planter box.

10. A floating planter box comprising:
   a) a generally regular polyhedral planar base member of selected thickness with top and bottom surfaces and an outer edge, said base member composed of a rigid synthetic foam polymer resin less dense than water and essentially impervious to water;
   b) a pair of generally regular polyhedral planar frame members of selected thickness conforming to the outer edge of and framing said generally regular polyhedral base member, said frame members being no larger than said base member, a first frame member positioned on the top surface of said base member and a second frame member positioned on the bottom surface of said base member, said first planar frame member about four times the thickness of said second frame member and of about equal thickness as said planar base member;
   c) a plurality of generally rectangular planar side members oriented perpendicular to, and completely surrounding said frame members and said planar base member, said side members each positioned in close contact with adjacent side members and securely attached to both of said pair of frame members securing said base member between said pair of frame members, said side members extending a selected distance below said bottom surface of said base member and a selected distance above said top surface of said base member, said first frame member and base member top surface forming a contained volume there upon, adapted to contain soil or growth material with plants therein, said planter box displacing sufficient water to float said box plus soil and plants therein, when placed in a body of water.

11. A planter box according to claim 10 wherein said base member is composed of polystyrene foam resin and said plurality of planar side members are a flexible synthetic resin sheeting material essentially impervious to water.

12. A planter box according to claim 10 wherein said regular polyhedral planar base member and said regular polyhedral planar frame members are generally of a rectangular shape.

13. A planter box according to claim 12 further comprising four bracing members, each member fastened between adjacent sides of said rectangular second frame member positioned on the bottom surface of said base member, said bracing members thereby stiffening said second frame member and supporting said base member thereon.

14. A planter box according to claim 11 wherein said regular polyhedral planar base member and said regular polyhedral planar frame members are generally of an octahedral shape.

15. A planter box according to claim 14 further comprising four bracing members, each member fastened between alternating sides of said octahedral second frame member positioned on the bottom surface of said base member, said bracing members thereby stiffening said second frame member and supporting said base member thereon.

16. A planter box according to claim 10 further comprising anchoring means attached to said second frame member positioned on the bottom surface of said base member to anchor said floating planter box at a selected location on a body of water.

17. A planter box according to claim 10 wherein said frame members are made of rot resistant wood.

18. A planter box according to claim 11 wherein said first frame member contains at least one aperture to allow water to flow out of said planter box.

* * * * *